May 20, 1930. W. C. BUCKBEE ET AL 1,759,537
FLUID OPERATED CIRCUIT CONTROLLER
Filed April 30, 1928 2 Sheets-Sheet 1
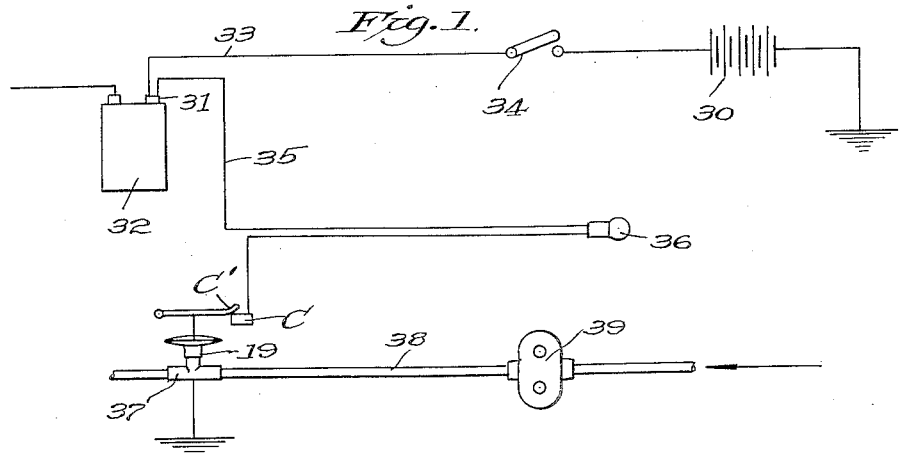
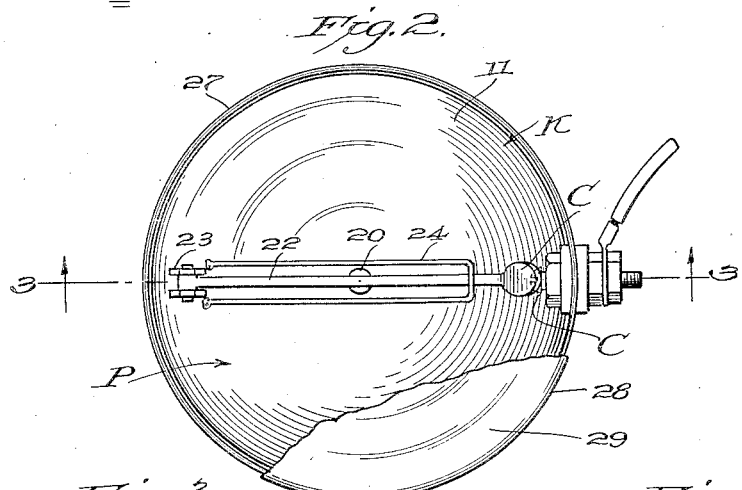
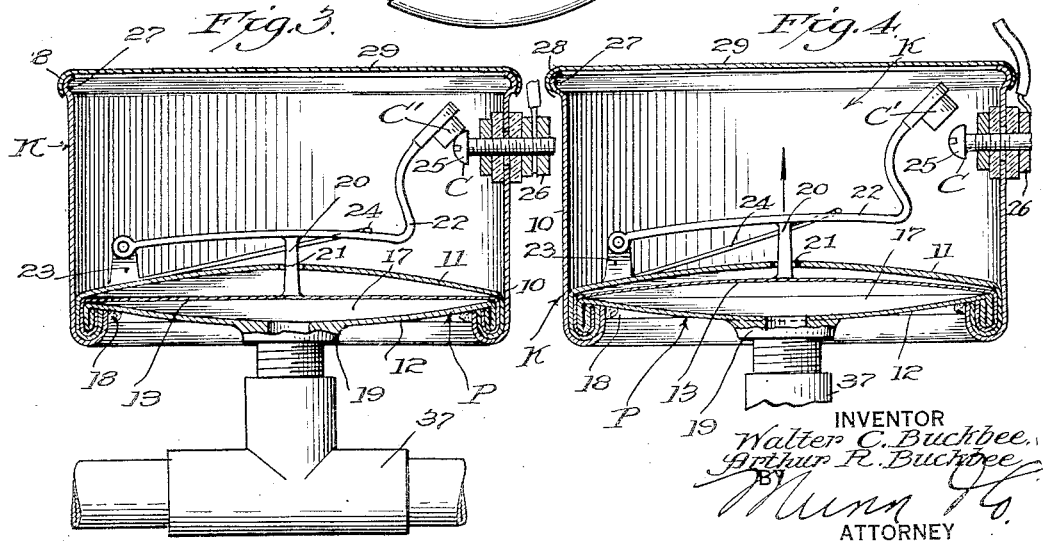

May 20, 1930.  W. C. BUCKBEE ET AL  1,759,537
FLUID OPERATED CIRCUIT CONTROLLER
Filed April 30, 1928   2 Sheets-Sheet 2
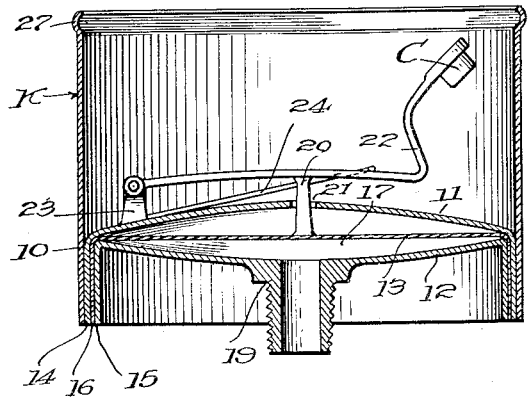
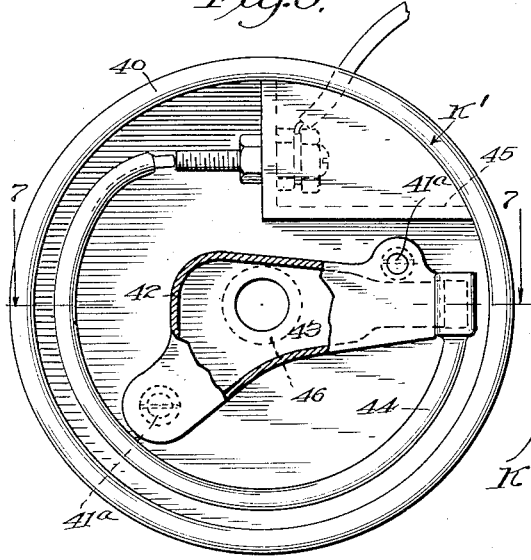
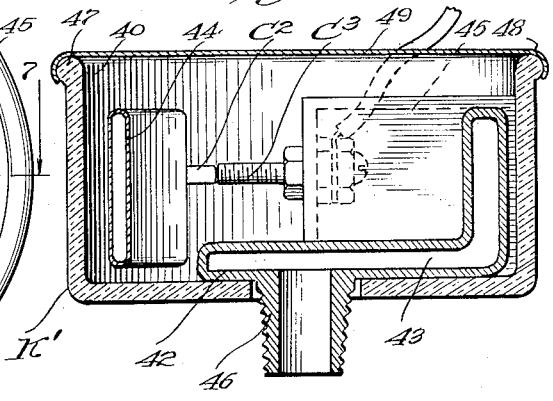
INVENTORS
Walter C. Buckbee,
Arthur R. Buckbee
BY
Munn & Co.
ATTORNEY Patented May 20, 1930

1,759,537

UNITED STATES PATENT OFFICE

WALTER C. BUCKBEE AND ARTHUR R. BUCKBEE, OF WHITTIER, CALIFORNIA

FLUID-OPERATED CIRCUIT CONTROLLER

Application filed April 30, 1928. Serial No. 274,079.

Our invention relates to and has for a purpose the provision of a simple, substantial and dependable fluid operated circuit controller of general application but which in one of its many adaptations, is capable of controlling a circuit including a signal for indicating to the operator of a motor vehicle whether or not the lubricating system of the vehicle's motor is functioning properly, or a sufficient quantity of lubricant is being circulated to insure the continued operation of the motor without damage from lack of lubrication. The circuit controller in this instance is preferably associated with the oil circulating pump of the motor in such manner as to be operable in response to a predetermined pressure delivered by the pump, to disrupt an electrical circuit including the signal which may be a lamp disposed at a place on the vehicle within view of the operator, to thus extinguish the lamp and appraise the operator that the pump is in operation and is circulating the required amount of lubricant, whereas should operation of the pump cease, the absence of pressure therefrom will result in completion of the circuit by the circuit controller to thereby cause the lamp to burn and thus warn the operator that oil is not being circulated through the motor and that the operation of the motor should be discontinued to prevent damage to the working parts thereof.

Furthermore the circuit above referred to may be the conventional ignition circuit of the vehicle's motor having the usual master or ignition switch; and in this instance the circuit controller embodying my invention may be included with the signal lamp in this circuit in such manner that upon closing of the ignition switch, the lamp will burn providing the ignition circuit is intact between the source of current supply and the spark coil or distributor, to thus serve as an indication that current is being delivered to these devices, as well as directing the operator's attention to the fact that the ignition switch is closed so that the latter will not be inadvertently allowed to remain closed with the attendant waste of current, when the vehicle is to be left parked.

We will describe only two forms of fluid operated circuit controllers embodying our invention, and will then point out the novel features in claims.

In the accompanying drawing,

Fig. 1 is a diagrammatic view illustrating the manner in which the circuit controller embodying our invention is adapted to be associated with the ignition circuit and oil pump of a vehicle's motor;

Fig. 2 is a plan view partly broken away, of one form of fluid operated circuit controller embodying our invention:

Fig. 3 is a sectional view taken on the line 3—3 of Fig. 2 and illustrating one position occupied by the circuit controller;

Fig. 4 is a view similar to Fig. 3 and illustrating another position occupied by the circuit controller;

Fig. 5 is a sectional view illustrating the manner in which certain parts of the circuit controller shown in the preceding views are adapted to be assembled;

Fig. 6 is a plan view, broken away, and illustrating another form of circuit controller embodying our invention; and Fig. 7 is a sectional view taken on the line 7—7 of Fig. 6 and looking in the direction of the arrows.

Referring specifically to the drawings in which similar reference characters designate similar parts in each of the several views, and particularly to Figs. 1 to 5 inclusive, our invention in its present embodiment comprises a casing K having therein stationary and movable contacts C and C' respectively and a pressure responsive device P operatively connected to the movable contact. The casing K in the present instance is constructed of metal to provide an open ended cylinder 10, while the pressure responsive device comprises a pair of oppositely cupped members in the form of concavo-convex disks 11 and 12, between which is interposed a flexible metal diaphragm 13. The disks 11 and 12 and diaphragm 13 are provided with laterally projecting flanges 14, 15 and 16 respectively.

The disk 11, diaphragm 13 and disk 12 are of graduated diameters so that in assembling of these parts their peripheral flanges can be nested one within the other as shown in Fig. 5 and the parts then placed as a unit into one end of the cylinder 10, after which the wall of the cylinder and the flanges are inturned or crimped together as shown in Fig. 3, thus securing the disks and diaphragm together and to the cylinder 10 to close one open end of the latter.

A hermetically sealed chamber 17 is thus formed at the side of the diaphragm confronting the disk 12; and to further insure the chamber against leakage a line of solder can be applied to the free inturned end of the cylinder 10 as indicated at 18. The disk 12 is provided with a nipple 19 constituting a port through which fluid under pressure is adapted to be admitted to the chamber 17 to flex the diaphragm from its normal position shown in Fig. 3 to the position shown in Fig. 4; and to operatively connect the diaphragm to the movable contact C', we provide in the present instance a pin 20 secured to the center of the diaphragm and projecting freely through an opening 21 in the disk 11 for connection to an arm 22 pivoted at one end on a bracket 23 secured to the disk 11, and having secured thereto at its free end the movable contact C'.

The diaphragm 13 is urged to the normal position shown in Fig. 3 by means of a spring 24 engaging the arm 22, to normally maintain the contact C' in engagement with the contact C, which latter in the present instance is in the form of a headed screw 25 secured to and insulated from the wall of the cylinder 10 and constituting a binding post, for which purpose the screw is provided with a nut 26.

The other open end of the cylinder 10 is provided with a bead 27 over which is adapted to be sprung the flange 28 of a cover 29 so as to permanently secure the cover to the cylinder, thus entirely enclosing the working parts of the pressure responsive device as well as to the contacts C and C' so as to prevent tampering therewith.

In the use of the circuit controller above described as a means for controlling a suitable signal to indicate to the operator of a motor vehicle whether or not the lubricating system of the vehicle's motor is functioning properly, reference will be had to Fig. 1 wherein is diagrammatically shown a portion of a conventional form of ignition circuit for the motor, with which the circuit controller is preferably associated. This portion of the ignition circuit includes a battery 30, one side of which is grounded and the other side of which is connected to the primary terminal 31 of the usual spark coil 32 by means of a conductor 33 through which the flow of current from the battery is controlled by the usual master or ignition switch 34.

A conductor 35 is conducted to the primary terminal 31 and to the stationary contact C; and in series with this conductor is a signal in the present instance a distinctively colored lamp 36 which is placed in the vehicle at a position where it can be conveniently viewed by the operator of the vehicle.

To the nipple 19 is connected one branch of a T coupling 37, the other two branches of which are connected in series with an oil pipe 38 leading from the pressure side of an oil pump 39 such as is usually provided in a motor and is positively driven by the latter to force oil to working parts of the motor.

With the circuit controller applied as above described, and assuming that the vehicle's motor is not in operation, it will be clear that upon closing of the ignition switch 34, the lamp 36 will burn as the circuit from the battery 30 is completed through conductor 33, primary terminal 31, conductor 35, normally engaged contacts C and C', through the latter to the casing K which is grounded, and thence to the grounded side of the battery 30. Should that portion of the circuit between the battery 30 and primary terminal 31 not be intact when the switch 34 is closed the operator will be appraised of this fact as the lamp 36 will not burn, thereby providing a check on this portion of the circuit.

Upon starting of the vehicle's motor, and assuming that the oil pump 39 is functioning properly, and that a sufficient quantity of oil is contained in the motor to permit circulating thereof by the pump, it will be clear that oil under pressure will be forced into the chamber 17 to flex the diaphragm 13 to the position shown in Fig. 4, thus causing the movable contact C' to disengage the stationary contact C, thereby disrupting that portion of the circuit between the primary terminal 31 and grounded side of the battery, and extinguishing the lamp 36. The operator will thus be advised that the oil pump is in operation and that a sufficient quantity of oil is being circulated to prevent damage to working parts of the motor.

However, should the oil pump for any reason cease to operate while the motor remains in operation, the pressure of oil in the chamber 17 will be relieved from the diaphragm 13, thus permitting the diaphragm to move and be aided by the spring 24 to its normal position shown in Fig. 3, thereby moving the contact C' into engagement with the contact C, and thus again completing the circuit above described to cause the lamp 36 to burn. The operator is thus warned that the oil pump is not functioning properly and that further operation of the motor should be discontinued to prevent damage to its working parts.

Referring now to Figs. 6 and 7, we have herein shown a second form of fluid operated circuit controller which comprises a casing K' constructed of insulating material to provide a cup shaped cylindrical body 40 having secured therein by screws 41 a bracket 42 which is hollow to provide a passage 43 therethrough communicating at one end with a Bourdon tube 44 secured to the bracket at one end and having fixed thereto at its other end a contact C² which in the normal contracted position of the tube 44 engages a stationary contact C³ secured to the casing K' within a pocket 45 formed in the casing.

The other end of the bracket passage 43 terminates in a nipple 46 projecting from the casing through an opening therein, and constituting an inlet port through which fluid under pressure is adapted to be admitted to the passage 43 and interior of the tube 44. The open side of the casing K' is provided with a bead 47 over which is adapted to be sprung a flange 48 of the metal cover 49 to permanently secure the cover to the casing and prevent access to the interior of the latter.

In the operation of this form of our invention, the conductor 35 is connected to the contact C³, while the nipple 46 is connected to the T coupling 37, all in the same manner as the conductor and coupling were connected to the contact C and nipple 19 respectively, of the first described form of our circuit controller.

The operation of this form of circuit controller is identical to that above described in conjunction with the first form, and it will be clear that when the oil pump 39 is operating the Bourdon tube 34 will be expanded as a result of oil pressure therein, to thus disengage the contacts C² and C³ to extinguish the lamp 36, whereas should the pump cease to operate, the tube 34 will again contract, thus engaging the contacts and causing the lamp to burn as a warning to the operator that the pump is not functioning or that sufficient oil is not present in the motor to be circulated by the pump.

Although we have herein shown and described only two forms of fluid operated circuit controller embodying our invention, it is to be understood that various changes and modifications may be made therein without departing from the spirit of the invention and the spirit and scope of the appended claims.

We claim:

1. A pressure operated circuit controller comprising a cylindrical casing having an open end, a pair of disks in the casing adjacent its open end, a flexible diaphragm interposed between the disks and co-operating with one of the latter to form a chamber at one side of the diaphragm, the disks and diaphragm having laterally projecting peripheral flanges extending in one and the same direction, with the flange of one disk nested within the flange of the diaphragm, and the flange of the diaphragm nested within the flange of the other disk, the flange of said other disk being nested within the casing at its open end, so that by crimping together the wall of the casing at its open end the flanges of the disks and diaphragm, the disks and diaphragm will be secured to each other and to the casing to close the open end of the latter and hermetically seal said chamber, the chamber being provided with a port through which pressure from a pressure creating device is adapted to be admitted to the diaphragm to actuate the latter, a stationary contact, a movable contact insulated from the stationary contact, and means operatively connecting the movable contact and diaphragm operable in response to movements of the latter to move the movable contact into or out of engagement with the stationary contact.

2. A pressure operated circuit controller as embodied in claim 1 wherein one of the disks is provided with an opening, and said last means comprises an arm pivotally mounted on said one of the disks and carrying the movable contact, and a pin extending through said opening and connected to the diaphragm and arm.

3. A pressure operated circuit controller comprising a cylindrical casing having an open end, a pair of disks in the casing adjacent its open end, a flexible diaphragm interposed between the disks and co-operating with one of the latter to form a chamber at one side of the diaphragm, the disks and diaphragm having laterally projecting peripheral flanges extending in one and the same direction, with the flange of one disk nested within the flange of the diaphragm, and the flange of the diaphragm nested within the flange of the other disk, the flange of said other disk being nested within the casing at its open end, so that by crimping together the wall of the casing at its open end and the flanges of the disks and diaphragm, the disks and diaphragm will be secured to each other and to the casing to close the open end of the latter and hermetically seal said chamber, the chamber being provided with a port through which pressure from a pressure creating device is adapted to be admitted to the diaphragm to actuate the latter, and a switch comprising a pair of contacts controlled by the diaphragm.

Signed at Los Angeles in the county of Los Angeles and State of California this 19th day of April, A. D. 1928.

WALTER C. BUCKBEE.
ARTHUR R. BUCKBEE.